United States Patent
Azuma et al.

(10) Patent No.: US 9,208,421 B2
(45) Date of Patent: Dec. 8, 2015

(54) APPARATUSES AND METHODS GENERATING A TWO-DIMENSIONAL CODE WITH A LOGO

(75) Inventors: Youichi Azuma, Tokyo (JP); Hideaki Kishi, Tokyo (JP); Tomoko Shinotani, Tokyo (JP)

(73) Assignee: A.T COMMUNICATIONS CO., LTD., Tokyo (JP)

( * ) Notice: Subject to any disclaimer, the term of this patent is extended or adjusted under 35 U.S.C. 154(b) by 451 days.

(21) Appl. No.: 13/637,059

(22) PCT Filed: Mar. 18, 2011

(86) PCT No.: PCT/JP2011/056655
§ 371 (c)(1),
(2), (4) Date: Oct. 10, 2012

(87) PCT Pub. No.: WO2011/118540
PCT Pub. Date: Sep. 29, 2011

(65) Prior Publication Data
US 2013/0021364 A1      Jan. 24, 2013

(30) Foreign Application Priority Data
Mar. 26, 2010 (JP) .................................. 2010-073349

(51) Int. Cl.
G09G 5/02 (2006.01)
G06K 19/06 (2006.01)
G06K 7/14 (2006.01)

(52) U.S. Cl.
CPC ........ *G06K 19/06103* (2013.01); *G06K 7/1417* (2013.01); *G06K 19/0614* (2013.01); *G06K 19/06037* (2013.01)

(58) Field of Classification Search
None
See application file for complete search history.

(56) References Cited

U.S. PATENT DOCUMENTS

2008/0002853 A1* 1/2008 Kawabe et al. ............... 382/100
2009/0255992 A1* 10/2009 Shen .......................... 235/462.1

FOREIGN PATENT DOCUMENTS

| JP | 11-353436 | 12/1999 |
|---|---|---|
| JP | 2005-332112 | 12/2005 |
| JP | 2007-287004 | 11/2007 |
| JP | 2008-015642 | 1/2008 |
| JP | 2009-104451 | 5/2009 |
| JP | 2010-165340 | 7/2010 |

* cited by examiner

*Primary Examiner* — Yingchun He
(74) *Attorney, Agent, or Firm* — K&L Gates, LLP; Louis Cullman; Robert Winn

(57) ABSTRACT

A logo-added two-dimensional code creation device determines the color of a two-dimensional code to be superimposed on a logo image by adjusting the L value indicating the color lightness, whereby a logo-added two-dimensional code readable regardless of influence of post-printing processing and/or ambient light can be created. The logo-added two-dimensional code has smaller cells superimposed on the tiger character that can easily lose the design integrity than the cells superimposed on the background part, ensuring the design integrity of the logo image without impairing the readability of information.

17 Claims, 12 Drawing Sheets

FIG. 2
(a)
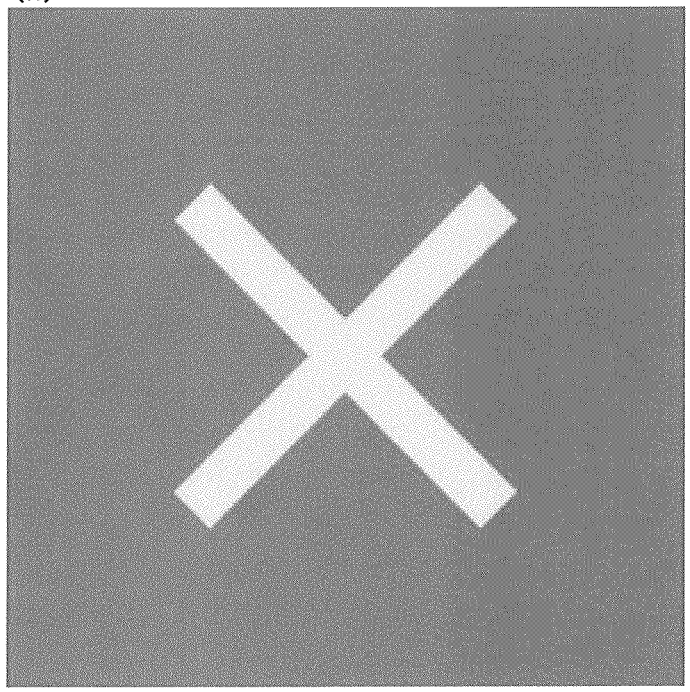
(b) REFERENCE REGION
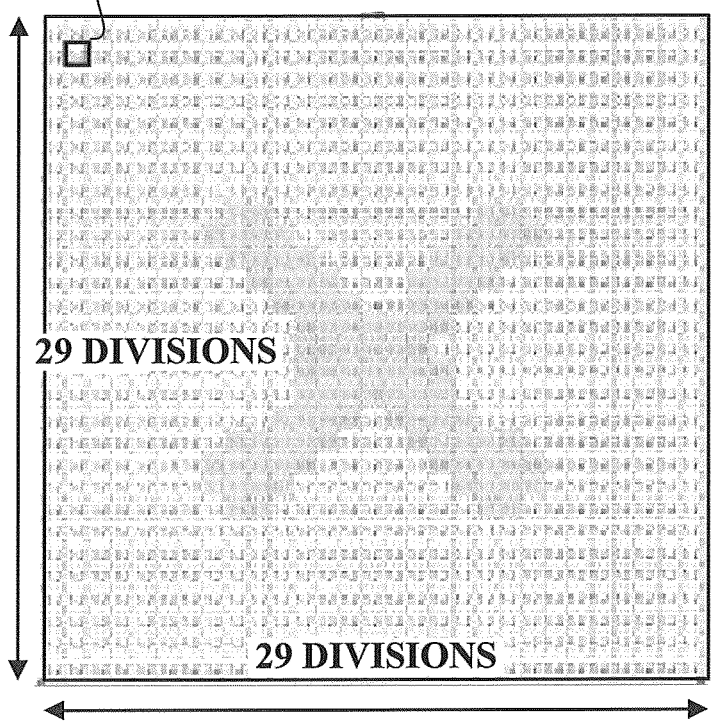
29 DIVISIONS
29 DIVISIONS

FIG. 10

CELL DB 85

| DESIGNATED COLOR | | NEGATIVE PART | POSITIVE PART |
|---|---|---|---|
| (1) | R255/G0/B255 | ○ | ▢ |
| (2) | R255/G0/B0 | ○ | ▢ |
| (3) | R0/G255/B0 | ○ | ▢ |
| (4) | R0/G0/B255 | ▢ | ● |
| (5) | R255/G255/B0 | ▢ | ● |
| (6) | R0/G255/B255 | ▢ | ▢ |
| (7) | R255/G126/B0 | ○ | ● |
| (8) | R126/G0/B255 | ○ | ● |
| (9) | R0/G126/B255 | ○ | ● |
| (10) | R0/G126/B0 | ○ | ● |
| (11) | R126/G0/B0 | ○ | ▢ |
| (12) | R0/G0/B126 | ○ | ▢ |

FIG. 14

CELL DB 86

| DESIGNATED COLOR | | NEGATIVE PART | POSITIVE PART |
|---|---|---|---|
| (1) | R255/G0/B255 | | |
| (2) | R255/G0/B0 | | |
| (3) | R0/G255/B0 | | |
| (4) | R0/G0/B255 | | |
| (5) | R255/G255/B0 | | |
| (6) | R0/G255/B255 | | |
| (7) | R255/G126/B0 | | |
| (8) | R126/G0/B255 | | |
| (9) | R0/G126/B255 | | |
| (10) | R0/G126/B0 | | |
| (11) | R126/G0/B0 | | |
| (12) | R0/G0/B126 | | |

APPARATUSES AND METHODS GENERATING A TWO-DIMENSIONAL CODE WITH A LOGO

CROSS REFERENCE TO RELATED APPLICATIONS

The present application is a National Stage of International Application No. PCT/JP2011/056655 filed on Mar. 18, 2011, which claims priority to Japanese Patent Application No. 2010-073349, filed in the Japanese Patent Office on Mar. 26, 2010, the entire contents of which are being incorporated herein by reference.

BACKGROUND

Among logo-added two-dimensional codes created by superimposing a two-dimensional code representing information by a distribution pattern of cells and a visible logo image, those consisting of cells of a given lightness or greater lightness superimposed on a logo image of given lightness or lower lightness have already been known (for example, see Patent Literature 1).

Furthermore, those consisting of cells of lightness lower than a given lightness superimposed on the part of a logo image that is of a given lightness or greater lightness and cells of given lightness or greater lightness superimposed on the part of the logo image that is of lightness lower than the given lightness have already been known. Such logo-added two-dimensional codes represent information by a distribution pattern of the cell of a given lightness or greater lightness and the part of the logo image that is of a given lightness or greater lightness, and the cell of a lightness lower than the given lightness and the part of the logo image that is of lightness lower than the given lightness (for example, see Patent Literature 2).

The specification, scope of claims, and drawings of the Patent Literature 1 and 2 are entirely incorporated herein by reference.

Patent Literature 1: Unexamined Japanese Patent Application Kokai Publication No. 2007-287004; and
Patent Literature 2: Unexamined Japanese Patent Application Kokai Publication No. 2008-015642.

Unlike two-dimensional codes consisting of only black and white cells, the aforementioned logo-added two-dimensional codes may not be read correctly under the influence of post-printing processing and/or ambient light.

Furthermore, the aforementioned logo-added tow-dimensional codes utilize the cells of a uniform size. Therefore, a problem arises that the design integrity of the logo image will be impaired as the cell size is increased, and the readability of information represented by the logo-added two-dimensional code will be impaired as the cell size is decreased.

Furthermore, in the aforementioned logo-added two-dimensional codes, either the cells of a lightness lower than a given lightness or the cells of a given lightness or greater lightness are alone superimposed on the part of a logo image that can be read as "0" or "1" depending on the influence of post-printing treatment and/or ambient light. Therefore, the information may not be read correctly.

The present invention is invented to solve the above problems and an exemplary object of the present invention is to provide a logo-added two-dimensional code that can be read correctly, and a logo-added two-dimensional code creation device, logo-added two-dimensional code creation method, and program for creating the logo-added two-dimensional code.

SUMMARY

In order to achieve the above object, the logo-added two-dimensional code creation device according to a first exemplary aspect of the resent invention is a logo-added two-dimensional code creation device creating a logo-added two-dimensional code consisting of a logo image in which a logo is depicted on a background and on which a two-dimensional code, representing given information of a distribution pattern of cells arranged in a matrix, is superimposed, comprising a logo image dividing means dividing the logo image presented by a Lab color space into multiple regions in accordance with the cells of the two-dimensional code to be superimposed; a cell setting means setting the L value of a first kind of cell among multiple kinds of cells forming the two-dimensional code based on the L value of a predetermined reference region among the multiple regions divided by the logo image dividing means; and a logo-added two-dimensional code creation means creating a logo-added two-dimensional code by superimposing on the logo image the first kind of cells of which the L value is set by the cell setting means and a second kind of cells different from the first kind among multiple kinds of cells forming the two-dimensional code.

It is possible that the above logo-added two-dimensional code creation device further comprises a reference L value determination means determining whether the L value of the reference region is equal to or greater than a given threshold, wherein the cell setting means sets the L value of the first kind of cells to a value equal to or greater than the L value of the reference region if the reference L value determination means determines that the L value of the reference region is equal to or greater than the given threshold, and sets the L value of the first kind of cell to a value equal to or lower than the L value of the reference region if the L value of the reference region is lower than the given threshold.

It is possible that the above logo-added two-dimensional code creation device further comprises an arithmetic value calculation means calculating an arithmetic value by adding a given number to the L value of the reference region if the reference L value determination means determines that the L value of the reference region is equal to or greater than the given threshold, and subtracting a given number from the L value of the reference region if the L value of the reference region is lower than the given threshold, wherein the cell setting means includes an arithmetic value determination means determining whether the arithmetic value calculated by the arithmetic value calculation means is within a range from a given lower limit to a given upper limit, and sets the L value of the first kind of cell to the given lower limit if the arithmetic value determination means determines that the arithmetic value is lower than the given lower limit, sets the L value of the first kind of cells to the arithmetic value if the arithmetic value is within a range from the given lower limit to the given upper limit, and sets the L value of the first kind of cells to the given upper limit if the arithmetic value is greater than the given upper limit.

It is possible that the above logo-added two-dimensional code creation device further comprises a logo image analysis means analyzing the logo image based on the L value of each region divided by the logo image dividing means and extracting from the logo image the regions where the logo is depicted and the regions where the background is depicted, wherein the cell setting means sets the L value of the first kind of cells to be superimposed on the regions where the logo is depicted to a value equal to or lower than the L value of the reference region if the reference L value determination means determines that the L value of the reference region is lower than the given threshold.

It is possible in the above logo-added two-dimensional code creation device that the cell setting means sets the a and b values of the first kind of cell to the a and b values of the regions where the analysis by the logo analysis means revealed that the logo is depicted.

It is possible in the above logo-added two-dimensional code creation device that the cell setting means sets the L value of the second kind of cell to a value equal to or greater than the given threshold.

It is possible that the above logo-added two-dimensional code creation device further comprises a color space conversion means converting the logo image presented by a color space different from the Lab color space to the logo image presented by the Lab color image, and a color space reconversion means reconverting the logo image created by the logo-added two-dimensional code creation means and presented by the Lab color space to the logo image presented by a color space different from the Lab color space.

It is possible that the above logo-added two-dimensional code creation device further comprises a cell reduction means reducing the first and second kinds of cell in size.

In order to achieve the above object, the logo-added two-dimensional code creation method according to a second exemplary aspect of the present invention is a logo-added two-dimensional code creation method for creating a logo-added two-dimensional code consisting of a logo image in which a logo is depicted on a background and on which a two-dimensional code representing given information by a distribution pattern of cells arranged in a matrix is superimposed, comprising a logo image dividing step of dividing the logo image presented by a Lab color space into multiple regions in accordance with the cells of the two-dimensional code to be superimposed; a cell setting step of setting the L value of a first kind of cell among multiple kinds of cells forming the two-dimensional code based on the L value of a predetermined reference region among the multiple regions divided in the logo image dividing step; and a logo-added two-dimensional code creation step of creating a logo-added two-dimensional code by superimposing on the logo image the first kind of cell of which the L value is set in the cell setting step and a second kind of cell different from the first kind among multiple kinds of cells forming the two-dimensional code.

In order to achieve the above object, the program according to a third exemplary aspect of the present invention allows the computer of a logo-added two-dimensional code creation device creating a logo-added two-dimensional code consisting of a logo image in which a logo is depicted on a background and on which a two-dimensional code representing given information by a distribution pattern of cells arranged in a matrix is superimposed to execute a logo image dividing procedure to divide the logo image presented by a Lab color space into multiple regions in accordance with the cells of the two-dimensional code to be superimposed; a cell setting procedure to set the L value of a first kind of cell among multiple kinds of cells forming the two-dimensional code based on the L value of a predetermined reference region among the multiple regions divided in the logo image dividing procedure; and a logo-added two-dimensional code creation procedure to create a logo-added two-dimensional code by superimposing on the logo image the first kind of cell of which the L value is set in the cell setting procedure and a second kind of cell different from the first kind among multiple kinds of cells forming the two-dimensional code.

In order to achieve the above object, the logo-added two-dimensional code according to a fourth exemplary aspect of the present invention is a logo-added two-dimensional code consisting of a logo image in which a logo is depicted on a background and on which a two-dimensional code representing given information by a distribution pattern of cells arranged in a matrix is superimposed, wherein the cells are different in size depending on which part of the logo image they are superimposed on.

It is possible in the above logo-added two-dimensional code that the cells superimposed on the part of the logo image where the logo is depicted are larger than the logo superimposed on the background.

It is possible in the above logo-added two-dimensional code that the two-dimensional code represents given information by a distribution pattern of a first kind of cell and a second kind of cell that have greater lightness than the first kind of cell; and only the first kind of cell are superimposed on the part of the logo image where the lightness is lower than first lightness, and both the first and second kinds of cell are superimposed on the part where the lightness is equal to or greater than the first lightness.

It is possible in the above logo-added two-dimensional code that both the first and second kind of cell are superimposed on the part of the logo image where the lightness is equal to or greater than the first lightness and lower than second lightness, and only the second kind of cell is superimposed on the part where the lightness is equal to or greater than the second lightness.

The present invention can provide a logo-added two-dimensional code that can be read correctly, and a logo-added two-dimensional code creation device, logo-added two-dimensional code creation method, and program for creating the logo-added two-dimensional code.

Additional features and advantages of the present invention are described herein, and will be apparent from, the following Detailed Description and the Figures.

BRIEF DESCRIPTION OF THE FIGURES

FIG. 2 (*a*) is an illustration showing an exemplary logo image and (b) is an illustration for explaining an exemplary logo image analysis process;

FIG. 10 is an illustration showing an exemplary cell DB structure according to Embodiment 2;

FIG. 14 is an illustration showing an exemplary cell DB structure according to a modified embodiment.

DETAILED DESCRIPTION

The present disclosure relates to a monitoring system wherein the monitoring system monitors tasks using a photographic device, and particularly relates to a monitoring system which groups and manages monitoring data, and to a monitoring system linked to a task system relating to the execution of tasks becoming the monitoring object of the monitoring system.

Best modes for carrying out the present invention will be described hereafter.

Embodiment 1

First, the configuration of the logo-added two-dimensional code creation device according to Embodiment 1 of the present invention will be described with reference to the drawings.

Figure 1:
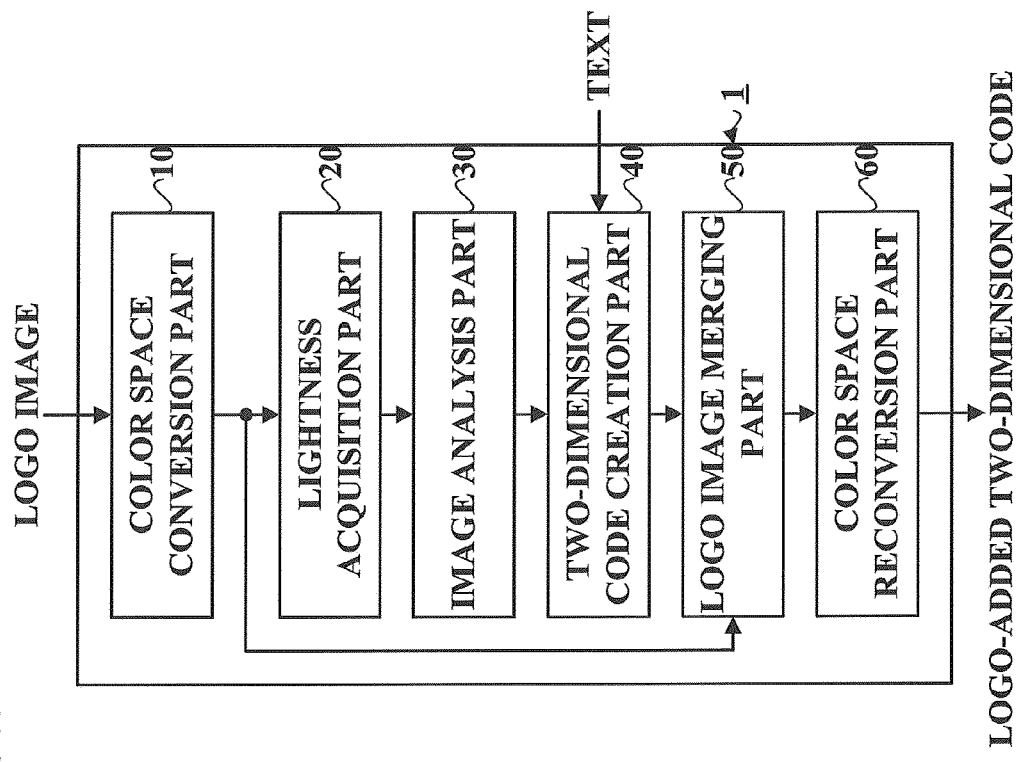
FIG. 1 is a block diagram showing an exemplary configuration of the logo-added two-dimensional code creation device according to Embodiment 1.

FIG. 1 is a block diagram showing an exemplary configuration of the logo-added two-dimensional code creation device according to Embodiment 1.

A logo-added two-dimensional code creation device 1 is realized by a general-purpose computer composed of, for example, a CPU (central processing unit), a ROM (read only memory), a RAM (random access memory), a hard disc drive, and so on, and comprises, as shown in FIG. 1, a color space conversion part 10, a lightness acquisition part 20, an image analysis part 30, a two-dimensional code creation part 40, a logo image merging part 50, and a color space reconversion part 60.

The color space conversion part 10 converts a logo image presented by the RGB color space or CMYK color space and on which a two-dimensional code such as a QR code (registered trademark) is to be superimposed on a logo image presented by a Lab color space.

The lightness acquisition part 20 divides the logo image converted by the color space conversion part 10 and presented by a Lab color space in accordance with the cell forming a two-dimensional code to be superimposed, and acquires an L value indicating color lightness (a value between "0" and "100") for each divided region. For example, if the two-dimensional code to be superimposed consists of 29×29 cells, the logo image having a logo depicted on a background as shown in FIG. 2 (a) is divided into 29×29 regions and an L value is obtained for each region as shown in FIG. 2 (b).

The image analysis part 30 shown in FIG. 1 comprises a background lightness flag and analyzes the logo image based on the L values acquired by the lightness acquisition part 20.

More specifically, the image analysis part 30 first determines whether the L value (the reference value) of the region that is the second from the left and the second from the top (the reference region) is equal to or greater than a threshold ("60" in this embodiment). Then, if it is equal to or greater than the threshold "60," the image analysis part 30 assumes that the background of the logo image will be judged to be "0" (="white") by a general-purpose two-dimensional code reader and clears the background lightness flag to the off state. On the other hand, if it is lower than the threshold "60," the image analysis part 30 concludes the analysis to reveal that the background of the logo image will be judged to be "1" (="black") by a general-purpose two-dimensional code reader. In the example of FIG. 2, the L value of the reference region is "52," which is lower than the threshold "60." Then, the image analysis part 30 assumes that the background of the logo image will be judged to be "1" (="black") by a general-purpose two-dimensional code reader and sets the background lightness flag to the on state.

Furthermore, the image analysis part 30 shown in FIG. 1 conducts a labeling process to add a group attribute to each pixel forming a logo image to extract the logo part regions and background part regions from the logo image and acquire them as the logo image analysis results. Here, the labeling process is a process to add the same label to connected pixels so as to group multiple regions. In this embodiment, a four-neighboring labeling process is conducted. More specifically, in the labeling process, first, a pixel with no label is found in the logo image and a new label is added thereto. Then, the same label is added to the pixels connected to that pixel in four directions. Then, the same label is added to the pixels connected to those pixels to which the same label was added. Thereafter, this operation is repeated as long as there are pixels to add a label in the logo image. Here, the search for pixels to add a label in a logo image is termed the scan. Use of the labeling process for extracting the logo part regions and background part regions from a logo image prevents a region of the logo part from being determined to be a region of the background part by mistake even if the logo part includes some regions having an L value equal to or close to that of the background part regions.

The two-dimensional code creation part 40 creates a two-dimensional code to be superimposed on a logo image. More specifically, the two-dimensional code creation part 40 creates a two-dimensional code presenting text consisting of numbers, characters, and/or symbols entered by a distribution pattern of black and white cells arranged in a matrix of 29×29.

Furthermore, the two-dimensional code creation part 40 separates the created two-dimensional code into a white cell part (negative part) and a black cell part (positive part) and, based on the analysis results of the image analysis part 30, further separates the negative part into a logo part and a background part to create a negative logo part and a negative background part, and further separates the positive part into a logo part and a background part to create a positive logo part and a positive background part.

Furthermore, the two-dimensional code creation part 40 determines whether the background lightness flag is on. If it is on, the two-dimensional code creation part 40 subtracts a predetermined value ("5" in this embodiment) from the reference value to obtain a subtracted value ("47" in the example of FIG. 2). Subsequently, the two-dimensional code creation part 40 determines whether the subtracted value is within a given value range ("0" to "45" in this embodiment).

The two-dimensional code creation part 40 sets the a and b values of the cells of the positive logo part to the a and b values of the regions determined to be the logo part by the image analysis part 30 at the beginning, and sets the L value of the cells of the positive logo part to the lower limit "0" if the subtracted value is lower than the lower limit "0" of the given value range, to the subtracted value if the subtracted value is within the given value range from "0" to "45," or to the upper limit "45" if the subtracted value is greater than the upper limit "45" of the given value range. Furthermore, the two-dimensional code creation part 40 sets the L value of the cells of the negative logo part and negative background part to "100."

On the other hand, if the background lightness flag is off, the two-dimensional code creation part 40 adds a predetermined value ("5" in this embodiment) to the reference value to obtained an added value. Subsequently, the two-dimensional code creation part 40 determines whether the added value is within a given value range ("0" to "45" in this embodiment).

The two-dimensional code creation part 40 sets the a and b values of the cells of the positive background part to the a and b values of the regions determined to be the logo part by the image analysis part 30 at the beginning, and sets the L value of the cells of the positive background part to the added value if the added value is within the given value range from "0" to "45," or to the upper limit "45" if the added value is equal to or greater than the upper limit "45" of the given value range. Furthermore, the two-dimensional code creation part 40 sets the L value of the cells of the negative logo part and negative background part to "100."

Figure 3:
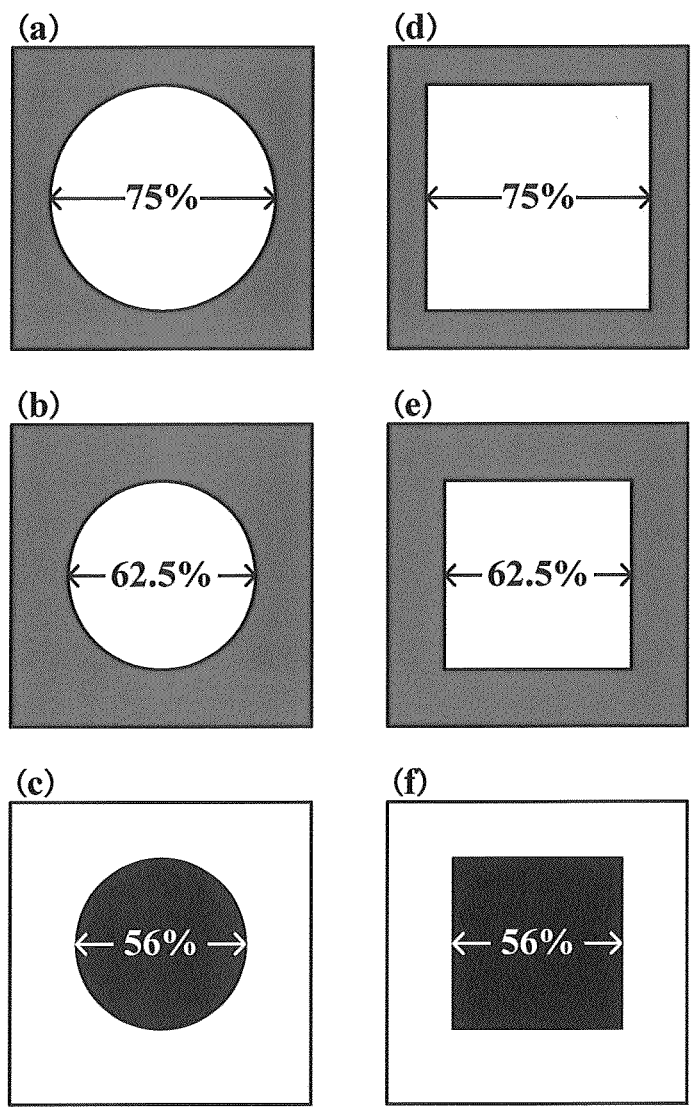
FIG. 3 is an illustration showing exemplary cell shapes.

Furthermore, in the case of using circular cells, the two-dimensional code creation part 40 transforms the cells of the negative and positive background parts into circular ones having a diameter corresponding to, for example, 75% of a side of the original cells as shown in FIG. 3 (*a*). Furthermore, the two-dimensional code creation part 40 transforms the cells of the negative logo part into circular ones having a diameter corresponding to, for example, 62.5% of a side of the original cells as shown in FIG. 3 (*b*) and transforms the cells of the positive logo part into circular ones having a diameter corresponding to, for example, 56% of a side of the original cells as shown in FIG. 3 (*c*). Here, the diameters of the transformed circular cells are not restricted to the above and can be changed on an arbitrary basis within the scope of its purpose.

On the other hand, in the case of using square cells, the two-dimensional code creation part 40 reduces the cells of the negative and positive background parts so that they have a side corresponding to, for example, 75% of a side of the original cells as shown in FIG. 3 (*d*). Furthermore, the two-dimensional code creation part 40 reduces the cells of the negative logo part so that they have a side corresponding to, for example, 62.5% of a side of the original cells as shown in FIG. 3 (*e*) and reduces the cells of the positive logo part so that they have a side corresponding to, for example, 56% of a side of the original cells as shown in FIG. 3 (*f*). Here, the lengths of a side of the reduced square cells are not restricted to the above and can be changed on an arbitrary basis within the scope of its purpose.

The logo image merging part 50 merges the logo image and the two-dimensional code created by the two-dimensional code creation part 40. More specifically, if the background lightness flag is on, the logo image merging part 50 superimposes the negative background part, negative logo part, positive logo part, and three positioning symbols consisting of a combination of squares with a specific ratio on the logo image in this order for merging. On the other hand, if the background lightness flag is off, the logo image merging part 50 superimposes the positive background part, negative logo part, positive logo part, and positioning symbols on the logo image in this order for merging.

Figure 4:
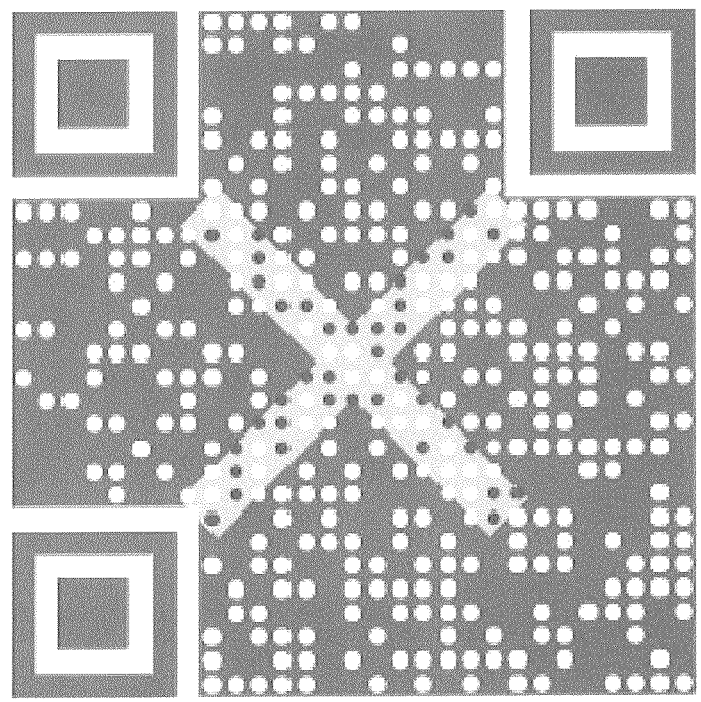
FIG. 4 is an illustration showing an exemplary logo-added two-dimensional code according to Embodiment 1.

The color space reconversion part 60 converts the logo-added two-dimensional code merged by the logo image merging part 50 and presented by a Lab color space to a logo-added two-dimensional code presented by the RGB color space or CMYK color space to create a logo-added two-dimensional code as shown in FIG. 4.

Specific operation of the logo-added two-dimensional code creation device having the above configuration will be described hereafter with reference to the drawings.

Figure 5:
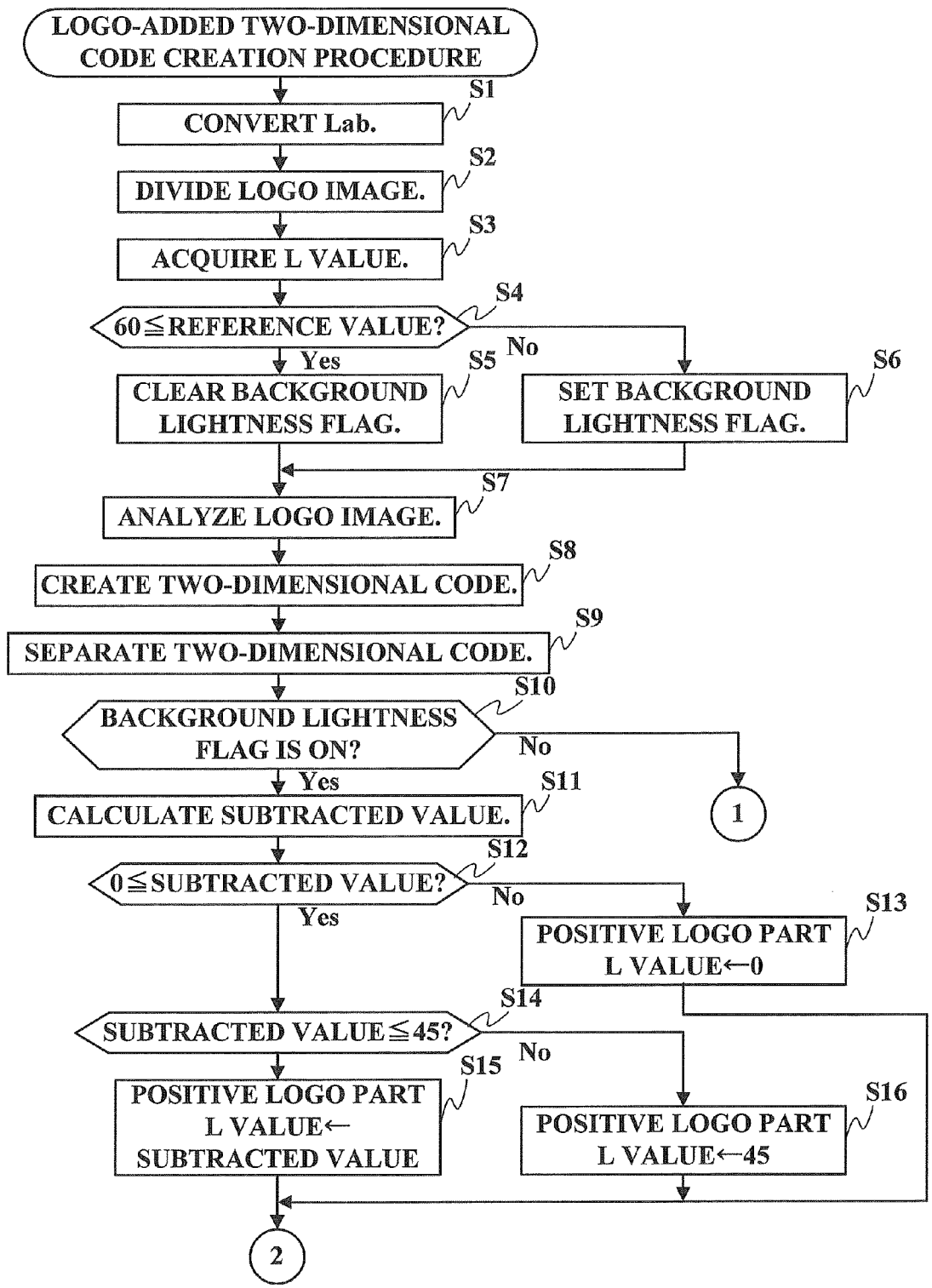
FIG. 5 is a flowchart showing an exemplary logo-added two-dimensional code creation method according to Embodiment 1.
Figure 6:
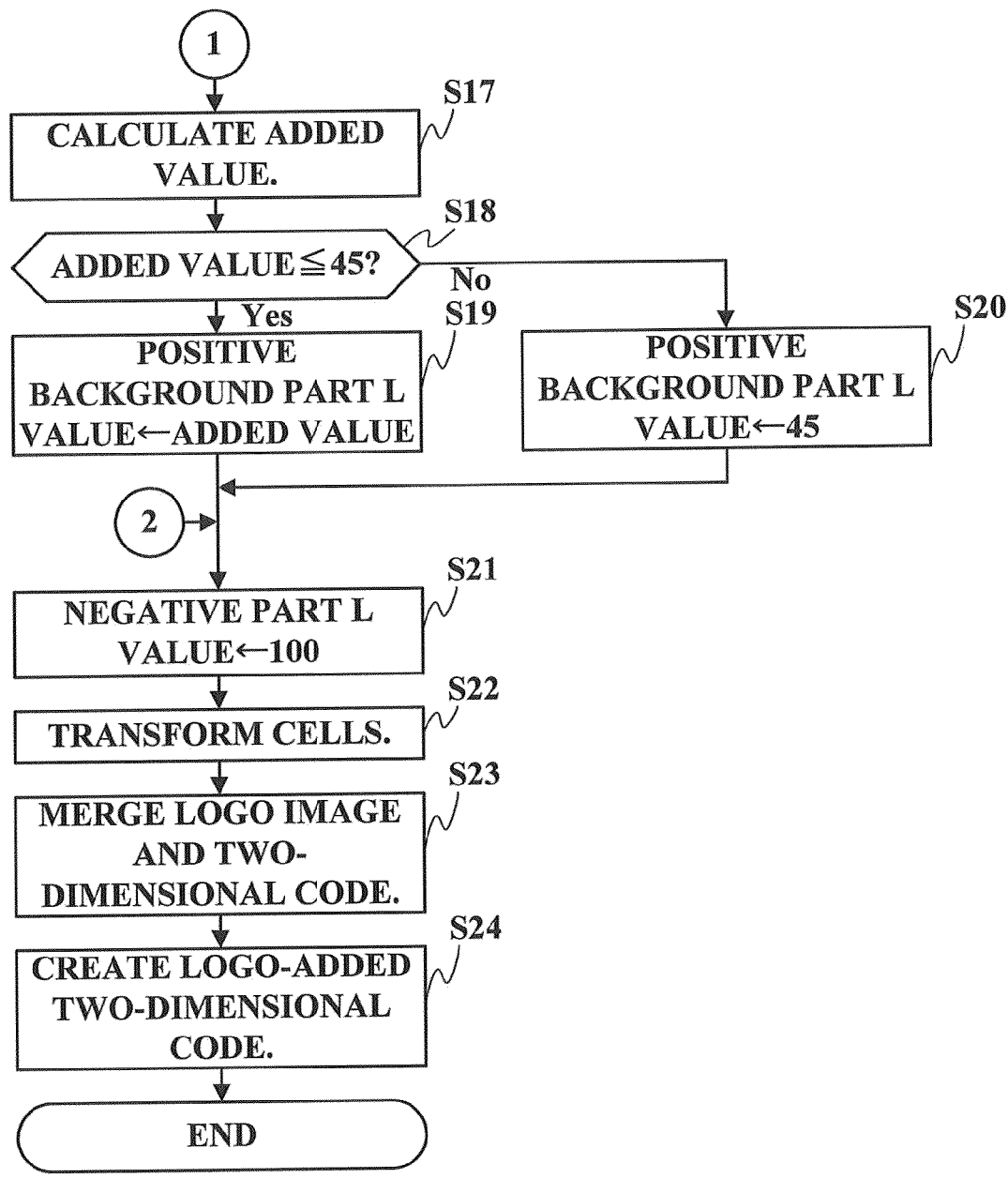
FIG. 6 is a flowchart showing an exemplary logo-added two-dimensional code creation method according to Embodiment 1.

For example, in response to a command to create a logo-added two-dimensional code after text consisting of numbers, characters, and/or symbols is entered and a logo image and the number and shape of cells forming a two-dimensional code are specified by the user, the logo-added two-dimensional code creation device 1 starts a logo-added two-dimensional code creation procedure shown in FIGS. 5 and 6.

In the logo-added two-dimensional code creation procedure, the logo-added two-dimensional code creation device 1 first utilizes the color space conversion part 10 to convert a logo image specified by the user and presented by the RGB color space or CMYK color space to a logo image presented by a Lab color space (Step S1 shown in FIG. 5).

Then, the logo-added two-dimensional code creation device 1 utilizes the lightness acquisition part 20 to divide the logo image converted in the processing of the Step S1 in accordance with the number of cells (for example, 29×29) forming a two-dimensional code specified by the user (Step S2) and acquire the L value of each divided region (Step S3).

Subsequently, the logo-added two-dimensional code creation device 1 utilizes the image analysis part 30 to determine whether the L value of the reference region divided in the Step S2 (the reference value) is equal to or greater than a threshold "60" (Step S4). Here, if the reference value is equal to or greater than the threshold "60" (Step S4; Yes), the logo-added two-dimensional code creation device 1 clears the background lightness flag to the off state (Step S5). On the other hand, if the reference value is lower than the threshold "60" (Step S4; No), the logo-added two-dimensional code creation device 1 sets the background lightness flag to the on state (Step S6).

Then, the logo-added two-dimensional code creation device 1 utilizes the image analysis part 30 to conduct the labeling process so as to extract logo part regions and background part regions from the logo image and acquire them as the logo image analysis results (Step S7).

Furthermore, the logo-added two-dimensional code creation device 1 utilizes the two-dimensional code creation part 40 to create a two-dimensional code presenting the text entered by the user (Step S8).

Then, the logo-added two-dimensional code creation device 1 utilizes the two-dimensional code creation part 40 to separate the two-dimensional code created in the processing of the Step S8 into a negative part and a positive part, and separate the negative part into a negative logo part and a negative background part, and separate the positive part into a positive logo part and a positive background part based on the analysis results in the processing of the Step S7 (Step S9).

Subsequently, the logo-added two-dimensional code creation device 1 utilizes the two-dimensional code creation part 40 to determine whether the background lightness flag is on (Step S10).

If the background lightness flag is on (Step S10; Yes), the logo-added two-dimensional code creation device 1 utilizes the two-dimensional code creation part 40 to subtract "5" from the reference value so as to obtain a subtracted value (Step S11), and determine whether the subtracted value is equal to or greater than a lower limit "0" (Step S12).

Here, if the subtracted value is lower than the lower limit "0" (Step S12; No), the logo-added two-dimensional code creation device 1 sets the a and b values of the cells of the positive logo part to the a and b values of the regions determined to be the logo part at the beginning in the processing of the Step S7 and the L value of the cells of the positive logo part to the lower limit (Step S13).

On the other hand, if the subtracted value is equal to or greater than the lower limit "0" (Step S12; Yes), the logo-added two-dimensional code creation device 1 determines whether the subtracted value is equal to or lower than an upper limit "45" (Step S14). If the subtracted value is equal to or lower than the upper limit "45" (Step S14; Yes), the logo-added two-dimensional code creation device 1 sets the a and b values of the cells of the positive logo part to the a and b values of the regions determined to be the logo part at the beginning in the processing of the Step S7 and the L value of the cells of the positive logo part to the subtracted value (Step S15).

On the other hand, if the subtracted value is greater than the upper limit "45" (Step S14; No), the logo-added two-dimensional code creation device 1 sets the a and b values of the cells of the positive logo part to the a and b values of the regions determined to be the logo part at the beginning in the processing of the Step S7 and the L value of the cells of the positive logo part to the upper limit "45" (Step S16).

If the background lightness flag is off (Step S10; No), the logo-added two-dimensional code creation device 1 adds a predetermined value to the reference value to obtain an added value (Step S17 shown in FIG. 6), and determine whether the added value is equal to or lower than the upper value "45" (Step S18). If the added value is equal to or lower than the upper value "45" (Step S18; Yes), the logo-added two-dimensional code creation device 1 sets the a and b values of the cells of the positive logo part to the a and b values of the regions determined to be the logo part at the beginning in the processing of the Step S7 and the L value of the cells of the positive background part to the added value (Step S19).

On the other hand, if the added value is greater than the upper limit "45" (Step S18; No), the logo-added two-dimensional code creation device 1 sets the a and b values of the cells of the positive logo part to the a and b values of the regions determined to be the logo part at the beginning in the processing of the Step S7 and the L value of the cells of the positive background part to the upper limit "45" (Step S20).

After executing the processing of one of the Steps S13, S15, S16, S19, and S20, the logo-added two-dimensional code creation device 1 utilizes the two-dimensional code creation part 40 to set the L value of the cells of the negative logo part and negative background part to "100" (Step S21).

Subsequently, the logo-added two-dimensional code creation device 1 utilizes the two-dimensional code creation part 40 to transform the cells into a shape specified by the user (Step S22).

In the processing of the Step S22, for transforming the cells into circular ones, the cells of the negative and positive background parts are transformed into circular ones having a diameter corresponding to, for example, 75% of a side of the original cells. Furthermore, the cells of the negative logo part are transformed into circular ones having a diameter corresponding to, for example, 62.5% of a side of the original cells, and the cells of the positive logo part are transformed into circular ones having a diameter corresponding to, for example, 56% of a side of the original cells.

On the other hand, for transforming the cells into square ones, the cells of the negative and positive background parts are reduced in size so that they have a side corresponding to, for example, 75% of a side of the original cells. Furthermore, the cells of the negative logo part are reduced in size so that they have a side corresponding to, for example, 62.5% of a side of the original cells, and the cells of the positive logo part are reduced in size so that they have a side corresponding to, for example, 56% of a side of the original cells.

Subsequently, the logo-added two-dimensional code creation device 1 utilizes the logo image merging part 50 to merge the logo image and the two-dimensional code created by the two-dimensional code creation part 40 (Step S23).

In the processing of Step S25, if the background lightness flag is on, the negative background part, negative logo part, positive logo part, and three positioning symbols consisting of a combination of squares with a specific ratio are superimposed on the logo image in this order for merging.

On the other hand, if the background lightness flag is off, the positive background part, negative logo part, positive logo part, and positioning symbols are superimposed on the logo image in this order for merging.

Then, the logo-added two-dimensional code creation device 1 utilizes the color space reconversion part 60 to convert the logo-added two-dimensional code merged by the logo image merging part 50 and presented by a Lab color space to a logo-added two-dimensional code presented by the RGB color space or CMYK color space so as to create a logo-added two-dimensional code (Step S24).

As described above, the logo-added two-dimensional code creation device 1 according to Embodiment 1 determines the color of a two-dimensional code superimposed on a logo image by adjusting the L value indicating the color lightness, whereby a logo-added two-dimensional code readable regardless of influence of post-printing processing and/or ambient light can be created.

Embodiment 2

The logo-added two-dimensional code creation device according to Embodiment 2 will be described hereafter with reference to the drawings.

Figure 7:
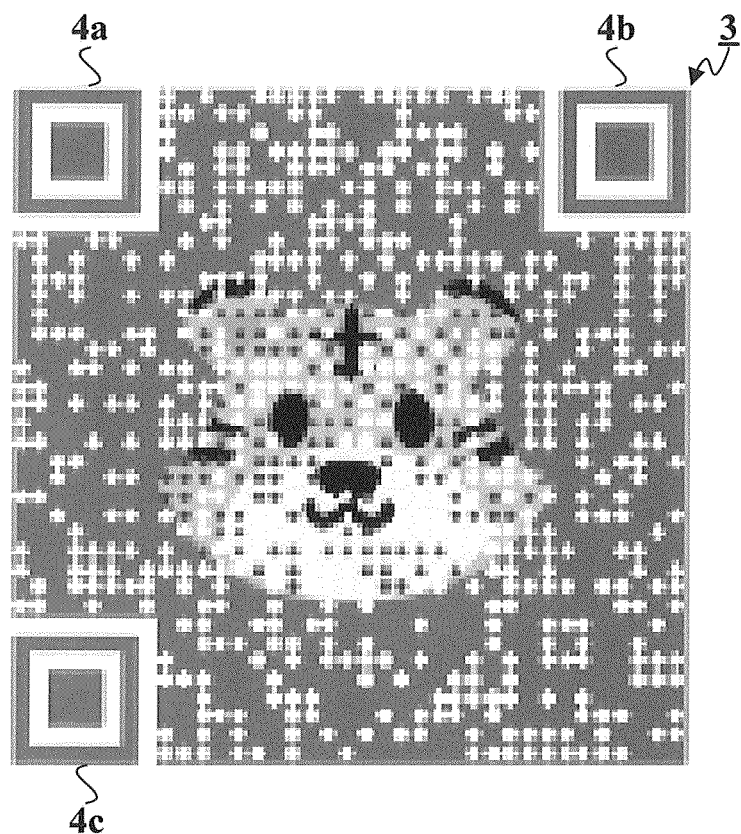
FIG. 7 is an illustration showing an exemplary logo-added two-dimensional code according to Embodiment 2.

FIG. 7 is an illustration showing an exemplary logo-added two-dimensional code according to Embodiment 2.

A logo-added two-dimensional code 3 is composed of, as shown in FIG. 7, a logo image in which, for example, a character (logo) of a tiger is visibly represented on a background and a two-dimensional code is superimposed thereon.

Here, the two-dimensional code is, for example, a QR (quick response) code (registered trademark) and consists of a matrix of 37×37 cells in this embodiment. The two-dimensional code represents given information (for example, a URL (uniform resource locator)) by a distribution pattern, for example, of negative type cells of which the lightness is judged to be "0" by a general-purpose two-dimensional code reader (for example, white cells) and positive type cells of which the lightness is judged to be "1" by a general-purpose two-dimensional code reader (for example, black cells) among the 37×37 cells.

The logo-added two-dimensional code 3 according to this embodiment comprises three positioning symbols 4a, 4b, and 4c consisting of a combination of squares with a specific ratio. Circular cells are arranged in a matrix between the positioning symbols 4a, 4b, and 4c.

More specifically, the negative type cells (for example, white cells) are superimposed on the background part of the logo image of which the lightness is judged to be "1" by a general-purpose two-dimensional code reader.

On the other hand, the negative type cells (for example, white cells) are superimposed on some of the parts of the tiger character in the logo image of which the lightness is judged to be "1" by a general-purpose two-dimensional code reader (for example, the stripes and mouth of the tiger), and neither the negative type cells (for example, white cells) nor the positive type cells (for example, black cells) are superimposed on some of those parts (for example, the eyes and nose of the tiger).

Furthermore, both the negative type cells (for example, white cells) and the positive type cells (for example, black cells) are superimposed on the parts of the tiger character in the logo image of which the lightness is judged to be "0" by a general-purpose two-dimensional code reader or of which the lightness is judged to be "0" or "1" depending on an influence of post-printing processing and/or ambient light.

As described above, only the negative type cells (for example, white cells) are superimposed on and no positive type cells (for example, black cells) are superimposed on the parts that are certainly judged to be "1" by a general-purpose two-dimensional code reader, whereby the logo-added two-dimensional code 3 ensures the design integrity of the logo image without impairing the readability of information.

Furthermore, the cells superimposed on the tiger character that can easily lose the design integrity are smaller than the cells superimposed on the background part, whereby the logo-added two-dimensional code 3 ensures the design integrity of the logo image.

The logo-added two-dimensional code creation device creating the above logo-added two-dimensional code will be described hereafter with reference to the drawings.

Figure 8:
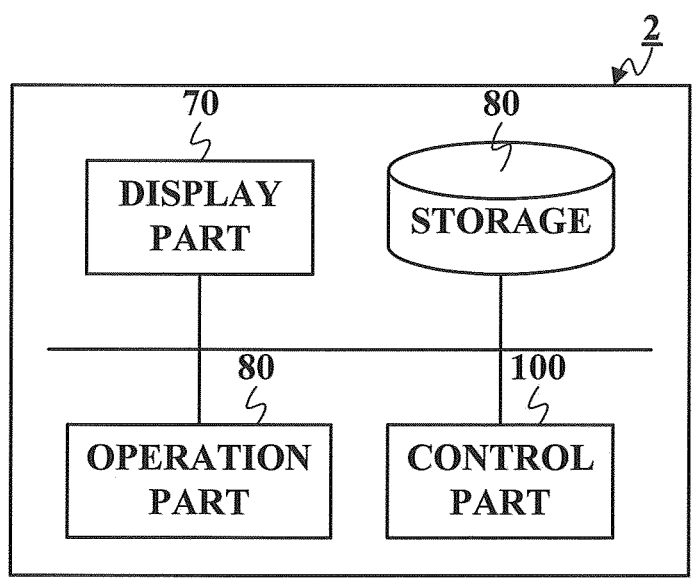
FIG. 8 is a block diagram showing an exemplary configuration of the logo-added two-dimensional code creation device according to Embodiment 2.
Figure 9:
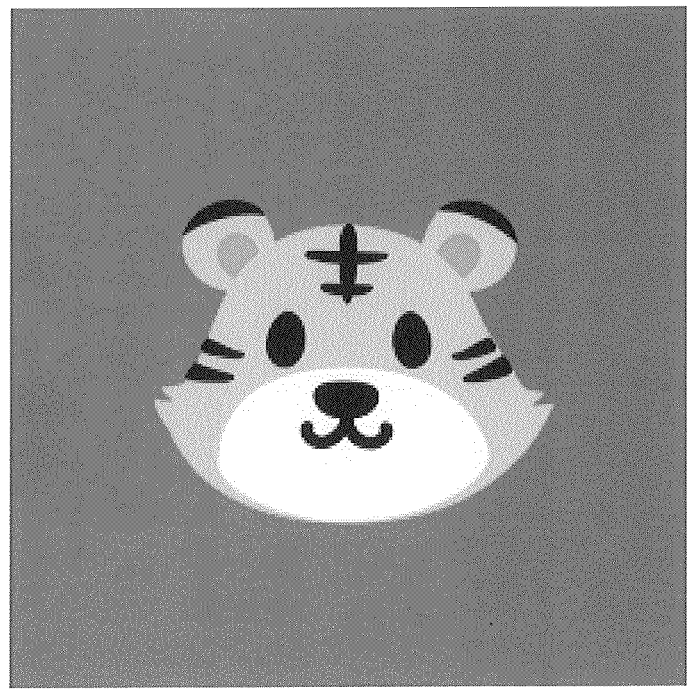
FIG. 9 is an illustration showing an exemplary logo image.

FIG. 8 is a block diagram showing an exemplary configuration of the logo-added two-dimensional code creation device according to Embodiment 2.

A logo-added two-dimensional code creation device 2 is realized by, for example, a general-purpose computer and composed of, as shown in FIG. 8, a display part 70, a storage 80, an operation part 90, and a control part 100.

The display part 70 is composed of, for example, a LCD (liquid crystal display) and displays a logo image (carpet image) on which a two-dimensional code is superimposed and an operation image for specifying a cell type of the two-dimensional code to be superimposed on the logo image.

The storage 80 is composed of, for example, a hard disc drive and stores various image data such as logo images and operation images, various programs, and various databases (DBs). As an example of the DBs, the storage 80 stores a cell DB 85 as shown in FIG. 10.

The cell DB 85 associates and registers the colors applied to the areas of an operation image (designated colors) and the cell types of a two-dimensional code as shown in FIG. 10.

In the areas colored in a designated color (1) R255/G0/B255, the circular negative type cells (for example, white cells) having a diameter corresponding to 80% of a side of the original cells are superimposed on the part of the logo image corresponding to the negative type cells (the negative part) while the part of the logo image corresponding to the positive type cells (the positive part) is displayed as it is as shown in FIG. 10.

In the areas colored in a designated color (2) R255/G0/B0, the circular negative type cells (for example, white cells) having a diameter corresponding to 70% of a side of the original cells are superimposed on the negative part of the logo image while the positive part of the logo image is displayed as it is as shown in FIG. 10.

In the areas colored in a designated color (3) R0/G255/B0, the circular negative type cells (for example, white cells) having a diameter corresponding to 60% of a side of the original cells are superimposed on the negative part of the logo image while the positive part of the logo image is displayed as it is as shown in FIG. 10.

In the areas colored in a designated color (4) R0/G0/B255, the negative part of the logo image is displayed as it is while the circular positive type cells (for example, black cells) having a diameter corresponding to 60% of a side of the original cells are superimposed on the positive part of the logo image as shown in FIG. 10.

In the areas colored in a designated color (5) R255/G255/B0, the negative part of the logo image is displayed as it is while the circular positive type cells (for example, black cells) having a diameter corresponding to 50% of a side of the original cells as are superimposed on the positive part of the logo image shown in FIG. 10.

In the areas colored in a designated color (6) R0/G255/B255, the logo image is displayed as it is as shown in FIG. 10.

In the areas colored in a designated color (7) R255/G126/B0, the circular negative type cells (for example, white cells) having a diameter corresponding to 80% of a side of the original cells are superimposed on the negative part of the logo image while the circular positive type cells (for example, black cells) having a diameter corresponding to 60% of a side of the original cells are superimposed on the positive part of the logo image as shown in FIG. 10.

In the areas colored in a designated color (8) R126/G0/B255, the circular negative type cells (for example, white cells) having a diameter corresponding to 80% of a side of the original cells are superimposed on the negative part of the logo image while the circular positive type cells (for example, black cells) having a diameter corresponding to 50% of a side of the original cells are superimposed on the positive part of the logo image as shown in FIG. 10.

In the areas colored in a designated color (9) R0/G126/B255, the circular negative type cells (for example, white cells) having a diameter corresponding to 60% of a side of the original cells are superimposed on the negative part of the logo image while the circular positive type cells (for example, black cells) having a diameter corresponding to 60% of a side of the original cells are superimposed on the positive part of the logo image as shown in FIG. 10.

In the areas colored in a designated color (10) R0/G126/B0, the circular negative type cells (for example, white cells) having a diameter corresponding to 60% of a side of the original cells are superimposed on the negative part of the logo image while the circular positive type cells (for example, black cells) having a diameter corresponding to 50% of a side of the original cells are superimposed on the positive part of the logo image as shown in FIG. 10.

In the areas colored in a designated color (11) R126/G0/B0, the circular negative type cells (for example, white cells) having a diameter corresponding to 95% of a side of the original cells are superimposed on the negative part of the logo image while the positive part of the logo image is displayed as it is as shown in FIG. 10.

In the areas colored in a designated color (12) R0/G0/B126, the circular negative type cells (for example, white cells) having a diameter corresponding to 90% of a side of the original cells are superimposed on the negative part of the logo image while the positive part of the logo image is displayed as it is as shown in FIG. 10.

The operation part 90 is composed of, for example, a keyboard and/or mouse and used, for example, for designating a color (designated color) for the areas of the operation image, specifying a logo image and/or the number of cells forming a two-dimensional code, and entering text consisting of numbers, characters, and/or symbols to be represented by a two-dimensional code. This embodiment is explained on the assumption that the areas of an operation image are colored in designated colors in advance. However, the present invention is not restricted thereto. The areas of an operation image can be colored in different colors each time a logo-added two-dimensional code is created.

The control part 100 is composed of, for example, a CPU, a ROM, a RAM, and so on. As the CPU executes various programs stored in the ROM or storage 80 as appropriate using the RAM as the work memory, the control part 100 controls the operation of each part of the logo-added two-dimensional code creation device 2.

Figure 11:
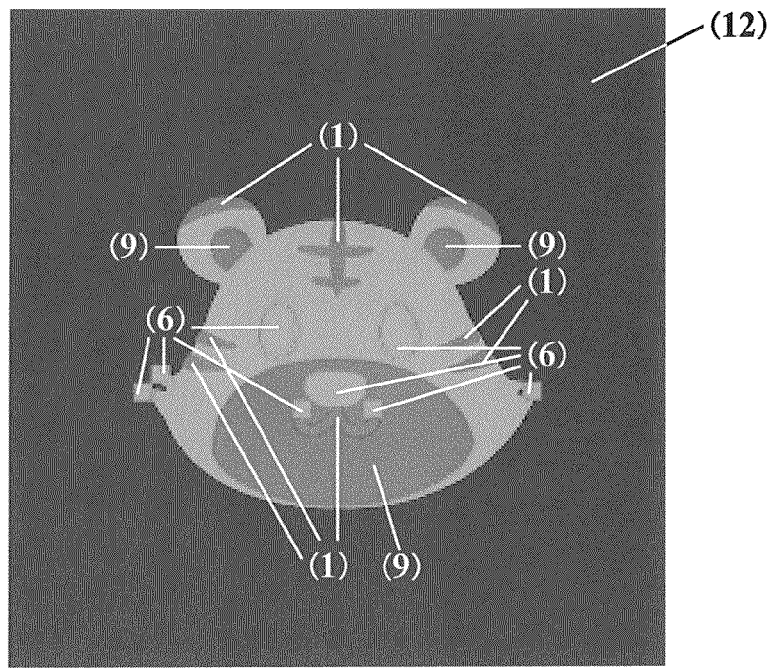
FIG. 11 is an illustration showing an exemplary operation image.

More specifically, the control part 100 colors the operation image displayed on the display part 70 in different colors according to the operation of the operation part 90, for example, as shown in FIG. 11. In the example of FIG. 11, the operation image is colored in the designated colors (1) R255/G0/B255, (6) R0/G255/B255, (9) R0/G126/B255, and (12) R0/G0/B126.

Furthermore, in response to a command to create a logo-added two-dimensional code after text consisting of, for example, numbers, characters, and/or symbols are entered into the operation part 90 and a logo image and/or the number of cells forming a two-dimensional code (for example, 37×37) are specified, the control part 100 creates a two-dimensional code presenting the text entered into the operation part 90 by a distribution pattern of white, negative type cells and black, positive type cells.

Figure 12:
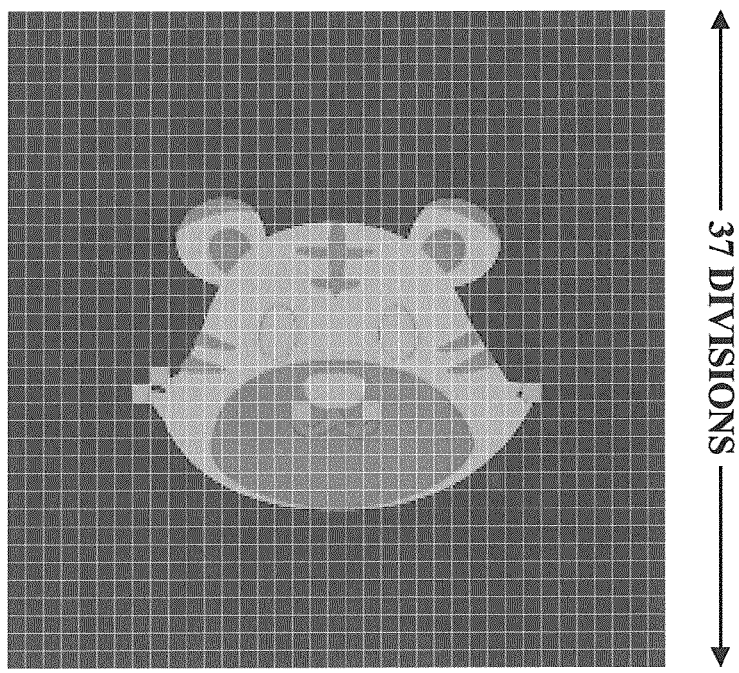
FIG. 12 is an illustration for explaining an exemplary cell type determination process.

Furthermore, the control part 100 divides the operation image into 37×37 cells in accordance with the cell size of the created two-dimensional code as shown in FIG. 12, and determines in which color each cell is colored among the designated colors (1) to (12). If a cell includes multiple designated colors, the designated color at the center of the cell is considered to be the designated color of the cell. Here, if there is a color designation error, an approximate value can be used for the determination.

Furthermore, the control part 100 specifies the cell type for each cell in accordance with the designated color of the cell and whether the cell is of the negative part or of the positive part from the cell DB 85 shown in FIG. 10.

In the example shown in FIG. 11, in the areas colored in the designated color (1) R255/G0/B255, the cell type of the negative part is specified as the circular white cell having a diameter corresponding to 80% of a side of the original cells, and the cell type of the positive part is specified as the logo image as it is.

In the areas colored in the designated color (6) R0/G255/B255, the cell type of the negative and positive parts is specified as the logo image as it is.

In the areas colored in the designated color (9) R0/G126/B255, the cell type of the negative part is specified as the circular white cell having a diameter corresponding to 60% of a side of the original cells, and the cell type of the positive part is specified as the circular black cell having a diameter corresponding to 60% of a side of the original cells.

In the areas colored in the designated color (12) R0/G0/B126, the cell type of the negative part is specified as the circular white cell having a diameter corresponding to 90% of a side of the original cells, and the cell type of the positive part is specified as the logo image as it is.

The control part 100 superimposes the specified types of cells in the corresponding areas of the logo image specified through the operation part 90 to create a logo-added two-dimensional code as shown in FIG. 7.

Specific operation of the logo-added two-dimensional code creation device having the above configuration will be described hereafter with reference to the drawings.

Figure 13:
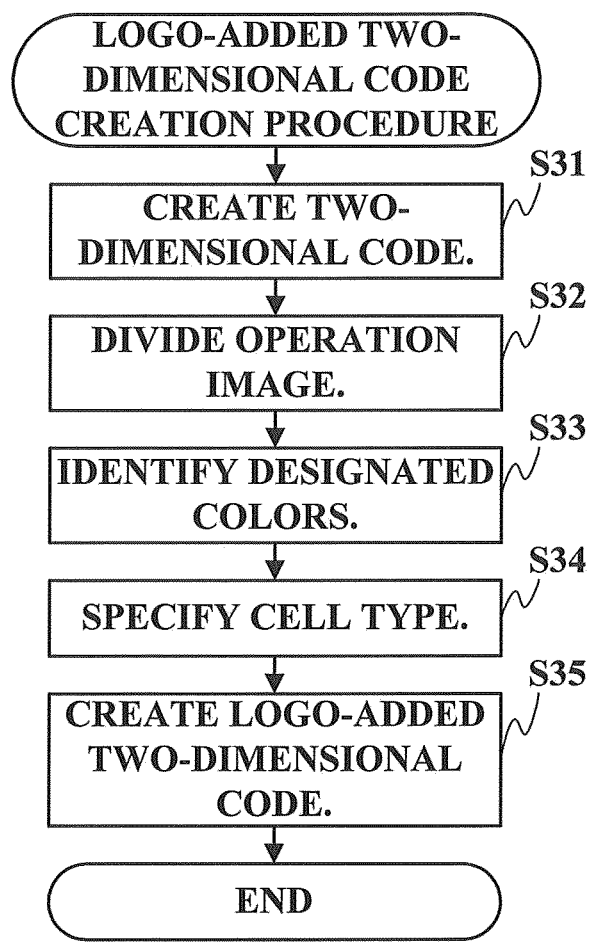
FIG. 13 is a flowchart showing an exemplary logo-added two-dimensional code creation method according to Embodiment 2.

For example, in response to a command to create a logo-added two-dimensional code after a logo image and the number of cells forming a two-dimensional code are specified and text consisting of numbers, characters, and/or symbols are entered through the operation part 90, the logo-added two-dimensional code creation device 2 starts a logo-added two-dimensional code creation procedure shown in FIG. 13.

In the logo-added two-dimensional code creation procedure, the control part 100 of the logo-added two-dimensional code creation device 2 first, as shown in FIG. 13, creates a two-dimensional code presenting the text entered into the operation part 90 by a distribution pattern of white, negative type cells and black, positive type cells (Step S31).

Then, the control part 100 divides an operation image corresponding to a logo image specified through the operation part 90 in accordance with the cell size of the two-dimensional code created in the processing of the Step S31 (Step S32). Then, the control part 100 determines in which color the cells divided in the processing of the Step S32 are colored among the designated colors (1) to (12) (Step S33).

Subsequently, the control part 100 specifies the cell type for each cell divided in the processing of the Step S32 in accordance with the designated color of the cell determined in the processing of the Step S33 and whether the cell is of the negative part or of the positive type from the cell DB 85 shown in FIG. 10 (Step S34).

Then, the control part 100 superimposes the cells of the types specified in the processing of the Step 34 onto the corresponding areas of the logo images specified through the operation part 90 to create a logo-added two-dimensional code (Step S35).

As described above, the logo-added two-dimensional code 3 according to Embodiment 2 utilizes the cells of different sizes depending on in which area of a logo image they are superimposed, whereby the design integrity of a logo image can be ensured without impairing the readability of information. More specifically, the cells superimposed on the tiger character that can easily lose the design integrity are smaller than the cells superimposed on the background part, whereby the logo-added two-dimensional code 3 ensures the design integrity of the logo image without impairing the readability of information.

Furthermore, the negative type cells (for example, white cells), not the positive type cells (for example, black cells), are superimposed on the part of the logo-added two-dimensional code 3 that is certainly judged to be "1" by a general-purpose two-dimensional code reader, whereby the logo-added two-dimensional code 3 ensures the design integrity of the logo image without impairing the readability of information.

The present invention is not confined to the above embodiments and various modifications and applications are available. Modified embodiments of the above embodiments that are applicable to the present invention will be described hereafter.

In the above-described Embodiment 1, the L value of the cells of the negative logo and negative background parts is set to "100." However, it can be set to any value equal to or greater than a threshold "60" and preferably a value equal to or greater than "70." In other words, the cells of the negative logo and negative background parts can be in some color other than "white."

In the above-described Embodiment 2, both the negative type cells (for example, white cells) and the positive type cells (for example, black cells) are superimposed anywhere other than the parts that are certainly judged to be "1" by a general-purpose two-dimensional code reader. However, the present invention is not confined thereto. Both the negative type cells (for example, white cells) and the positive type cells (for example, black cells) can be superimposed only on the parts having lightness judged to be "0" or "1" depending on the influence of post-printing processing and/or ambient light (for example, the face of the tiger). Furthermore, only the negative type cells (for example, white cells) and positive type cells (for example, black cells) can be superimposed on the parts that are certainly judged to be "0" by a general-purpose code reader. In this way, the logo-added two-dimensional code 3 ensures the design integrity of the logo image without impairing the readability of information.

In the above-described Embodiment 2, the logo-added two-dimensional code has circular cells. The present invention is not confined thereto and polygonal or star-shaped cells can be used. For example, if the two-dimensional code consists of cells of 4px×4px in size and square cells are superimposed on a logo image, the type of cells to be superimposed in each area of the logo image can be determined with reference to a cell DB 86 shown in FIG. 14.

In the above-described Embodiment 2, the negative type cells are white and the positive type cells are black by way of example. However, the present invention is not confined thereto. The negative type cells can be in any color as long as they are judged to be "0" by a general-purpose two-dimensional code reader and the positive type cells can be in any color as long as they are judged to be "1" by a general-purpose two-dimensional code reader.

In the above-described Embodiment 2, a logo image and the number of cells forming a two-dimensional code are specified through the operation part 90 for creating a logo-added two-dimensional code. However, the present invention is not confined thereto. Instead of or in addition to specifying a logo image and the number of cells forming a two-dimensional code through the operation part 90, the size of cells forming a two-dimensional code (for example, 18 mm (25 mm including the margins) for use in business cards, 42 mm (60 mm including the margins) for use in indoor posters, and 116 mm (162 mm including the margins) for use in outdoor posters), the shape of cells to be superimposed on a logo image, and the colors of negative type and positive type cells can be specified.

In the above-described Embodiment 2, the logo-added two-dimensional code creation procedure is executed according to operation on the operation part 90. However, the present invention is not confined thereto. The logo-added two-dimensional code creation procedure can be executed according to commands from an external communication terminal. More specifically, the control part 100 of the logo-added two-dimensional code creation device 2 can execute the logo-added two-dimensional code creation procedure in response to a command to create a logo-added two-dimensional code after receiving a specified logo image, the number of cells forming a two-dimensional code, and text entered from an external communication terminal via a network. Then, the logo-added two-dimensional code created in the logo-added two-dimensional code creation procedure can be displayed on the screen of the external communication terminal for approval, and then downloaded to the external communication terminal from the logo-added two-dimensional code creation device 2 via the network.

The number of cells forming a two-dimensional code is 29×29 in the above-described Embodiment 1, and the number of cells forming a two-dimensional code is 37×37 in the above-described Embodiment 2. However, the present invention is not confined thereto. The number of cells can be changed on an arbitrary basis and can be 33×33 or 41×41. Furthermore, the number of cells can be determined to be any one of 29×29, 33×33, 37×37, and 41×41 according to the entered text (for example, the number of characters). In such a case, the two-dimensional code creation part 40 or control part 100 can determine the number of cells according to the entered text and create a two-dimensional code presenting the entered text by a distribution pattern of white cells and black cells among the determined number of cells. Furthermore, the two-dimensional code creation part 40 can notify the lightness acquisition part 20 of the determined number of cells. Then, the lightness acquisition part 20 can divide a logo image in accordance with the notified number of cells. On the other hand, the control part 100 can divide in accordance with the determined number of cells.

In the above-described Embodiments 1 and 2, the two-dimensional code is a QR code (registered trademark) by way of example. However, the present invention is not confined thereto. The two-dimensional code can be another matrix form two-dimensional code such as data matrix, Aztec, Code One, array tag, box figure, maxi, peri, soft strip, CP, Karura, and ultra codes. Alternatively, the two-dimensional code can be a stacked form two-dimensional code consisting of one-dimensional bar codes stacked one on top of the other such as PDF 417, code 49, code 16k and Coda block.

Furthermore, in the above-described Embodiments 1 and 2, the programs executed by the CPU are stored in a ROM in advance. However, the present invention is not confined thereto. The programs for executing the above-described procedures can be applied to an existing general-purpose computer so that the computer functions as the logo-added two-dimensional code creation device 1 according to the above-described Embodiment 1 or as the logo-added two-dimensional code creation device 2 according to the above-described Embodiment 2.

The above programs can be provided by any method. For example, the programs can be stored and distributed on a computer-readable recording medium (a flexible disc, CD (compact disk)-ROM, DVD (digital versatile disk)-ROM, etc), or stored in a storage on a network such as the Internet and downloaded to provide them.

Furthermore, when the above-described procedures are executed by apportionment between an OS and application programs or cooperation of an OS and application programs, only the application programs can be stored on a recording medium or in a storage. Furthermore, the programs can be superimposed on carrier waves to distribute them via a network. For example, the above programs can be posted on a bulletin board system (BBS) of a network to distribute them via the network. Then, the programs can be activated and executed in a manner similar to other application programs under the control of an OS so that the above-described procedures are executed.

Various embodiments and modifications are available to the present invention without departing from the broad sense of spirit and scope of the present invention. The above-described embodiments are given for explaining an embodiment of the present invention and do not confine the scope of the present invention.

DESCRIPTION OF REFERENCE NUMERALS

1 Logo-added two-dimensional code creation device
2 Logo-added two-dimensional code creation device
3 Logo-added two-dimensional code
4a, 4b, 4c Positioning symbol
10 Color space conversion part
20 Lightness acquisition part
30 Image analysis part
40 Two-dimensional code creation part 50 Logo image merging part
60 Color space reconversion part
70 Display part
80 Storage
85 Cell DB
86 Cell DB
90 Operation part
100 Control part

The invention claimed is:

1. A logo-added two-dimensional code creation device creating a logo added two-dimensional code including a logo image in which a logo is depicted on a background and on which a two-dimensional code representing given information by a distribution pattern of cells arranged in a matrix is superimposed, the logo-added two-dimensional code creation device comprising:
   a logo image dividing means dividing the logo image presented by a Lab color space into multiple regions in accordance with the cells of the two-dimensional code to be superimposed;
   a cell setting means setting an L value of a first kind of cell among multiple kinds of cells forming the two-dimensional code based on an L value of a predetermined reference region among the multiple regions divided by the logo image dividing means; and
   a logo-added two-dimensional code creation means creating a logo-added two-dimensional code by superimposing on the logo image the first kind of cell of which the L value is set by the cell setting means and a second kind of cells different from the first kind among multiple kinds of cells forming the two-dimensional code.

2. The logo-added two-dimensional code creation device of claim 1, which includes:
   a reference L value determination means determining whether the L value of the reference region is equal to or greater than a given threshold, wherein the cell setting means sets:
   (a) the L value of the first kind of cells to a value equal to or greater than the L value of the reference region if the reference L value determination means determines that the L value of the reference region is equal to or greater than the given threshold; and
   (b) the L value of the first kind of cells to a value equal to or lower than the L value of the reference region it the L value of the reference region is lower than the given threshold.

3. The logo-added two-dimensional code creation device of claim 2; which includes:
   an arithmetic value calculation means calculating an arithmetic value by:
   (a) adding a given number to the L value of the reference region if the reference L value determination means determines that the L value of the reference region is equal to or greater than the given threshold; and
   (b) subtracting a given number from the L value of the reference region if the L value of the reference region is lower than the given threshold, wherein the cell setting means:
      (i) includes an arithmetic value determination means determining whether the arithmetic value calculated by the arithmetic value calculation means is within a range from a given lower limit to a given upper limit;
      (ii) sets the L value of the first kind of cells to the given lower limit if the arithmetic value determination means determines that the arithmetic value is lower than the given lower limit;
      (iii) sets the L value of the first kind of cells to the arithmetic value if the arithmetic value is within a range from the given lower limit to the given upper limit; and
      (iv) sets the L value of the first kind of cells to the given upper limit if the arithmetic value is greater than the given upper limit.

4. The logo-added two-dimensional code creation device of claim 2, which includes a logo image analysis means:
   (a) analyzing the logo image based on the L value of each region divided by the logo image dividing means; and
   (b) extracting from the logo image the regions where the logo is depicted and the regions where the background is depicted, wherein the cell setting means sets the L value of the first kind of cells to be superimposed on the regions where the logo is depicted to a value equal to or lower than the L value of the reference region if the reference L value determination means determines that the L value of the reference region is lower than the given threshold.

5. The logo-added two-dimensional code creation device of claim 4, wherein the cell setting means sets the a and b values of the first kind of cell to the a and b values of the regions where the analysis by the logo analysis means revealed that the logo is depicted.

6. The logo-added two-dimensional code creation device of claim 2, wherein the cell setting means sets an L value of the second kind of cell to a value equal to or greater than the given threshold.

7. The logo-added two-dimensional code creation device of claim 1, which includes:
   a color space conversion means converting the logo image presented by a color space different from the Lab color space to the logo image presented by the Lab color image; and
   a color space reconversion means reconverting the logo image created by the logo-added two-dimensional code creation means and presented by the Lab color space to the logo image presented by a color space different from the Lab color space.

8. The logo-added two-dimensional code creation device of claim 1, which includes a cell reduction means reducing the first and second kind of cells in size.

9. A non-transitory computer readable medium storing a program allowing a computer of a logo-added two-dimensional code creation device creating a logo-added two-dimensional code consisting of a logo image in which a logo is depicted on a background and on which a two-dimensional code representing given information by a distribution pattern of cells arranged in a matrix is superimposed to execute:
   a logo image dividing procedure to divide the logo image presented by a Lab color space into multiple regions in accordance with the cells of the two-dimensional code to be superimposed;
   a cell setting procedure to set an L value of a first kind of cells among multiple kinds of cells forming the two-dimensional code based on an L value of a predetermined reference region among the multiple regions divided in the logo image dividing procedure; and
   a logo-added two-dimensional code creation procedure to create a logo-added two-dimensional code by superimposing on the logo image the first kind of cell of which the L value is set in the cell setting procedure and a second kind of cell different from the first kind among multiple kinds of cells forming the two-dimensional code.

10. A logo-added two-dimensional code creation device, configured to create a logo-added two-dimensional code consisting of a logo image in which a logo is depicted on a background and on which a two-dimensional code representing given information by a distribution pattern of cells arranged in a matrix is superimposed, comprising:
a processor configured to perform:
a logo image dividing process comprising dividing the logo image presented by a Lab color space into multiple regions in accordance with the cells of the two-dimensional code to be superimposed;
a cell setting processing comprising setting an L value of a first kind of cells among multiple kinds of cells forming the two-dimensional code based on an L value of a predetermined reference region among the multiple regions divided in the logo image dividing process; and
a logo-added two-dimensional code creating process comprising creating a logo-added two-dimensional code by superimposing on the logo image the first kind of cells of which the L value is set in the cell setting process and a second kind of cells different from the first kind among multiple kinds of cells forming the two-dimensional code.

11. The logo-added two-dimensional code creation device of claim 10,
wherein the processor is further configured to perform a reference L determining process comprising determining whether the L value of the reference region is equal to or greater than a given threshold, and
wherein the cell setting process sets: (a) the L value of the first kind of cells to a value equal to or greater than the L value of the reference region if the L value of the reference region is determined to be equal to or greater than the given threshold; and (b) the L value of the first kind of cells to a value equal to or lower than the L value of the reference region if the L value of the reference region is determined to be lower than the given threshold.

12. The logo-added two-dimensional code creation device of claim 11,
wherein the processor is further configured to perform an arithmetic value calculating process comprising calculating an arithmetic value by:
(a) adding a given number to the L value of the reference region if the L value of the reference region is determined to be equal to or greater than the given threshold; and
(b) subtracting a given number from the L value of the reference region if the L value of the reference region is determined to be lower than the given threshold, and
wherein the cell setting process:
(i) includes an arithmetic value determining process comprising determining whether the arithmetic value calculated by the arithmetic value calculating process is within a range from a given lower limit to a given upper limit;
(ii) sets the L value of the first kind of cells to the given lower limit if the arithmetic value is determined to be lower than the given lower limit;
(iii) sets the L value of the first kind of cells to the arithmetic value if the arithmetic value is determined to be within a range from the given lower limit to the given upper limit; and
(iv) sets the L value of the first kind of cells to the given upper limit if the arithmetic value is determined to be greater than the given upper limit.

13. The logo-added two-dimensional code creation device of claim 11,
wherein the processor is further configured to perform a logo image analyzing process comprising:
(a) analyzing the logo image based on the L value of each region divided by the logo image divider; and
(b) extracting from the logo image the regions where the logo is depicted and the regions where the background is depicted, and
wherein the cell setting process sets the L value of the first kind of cells to be superimposed on the regions where the logo is depicted to a value equal to or lower than the L value of the reference region if the L value of the reference region is determined to be lower than the given threshold.

14. The logo-added two-dimensional code creation device of claim 13, wherein the cell setting process sets the a and b values of the first kind of cell to the a and b values of the regions where the analysis by the logo image analyzing process revealed that the logo is depicted.

15. The logo-added two-dimensional code creation device of claim 11, wherein the cell setting process sets an L value of the second kind of cell to a value equal to or greater than the given threshold.

16. The logo-added two-dimensional code creation device of claim 10, wherein the processor is further configured to perform:
a color space converting process comprising converting the logo image presented by a color space different from the Lab color space to the logo image presented by the Lab color image; and
a color space reconverting process comprising reconverting the logo image created by the logo-added two-dimensional code creating process and presented by the Lab color space to the logo image presented by a color space different from the Lab color space.

17. The logo-added two-dimensional code creation device of claim 10, wherein the processor is further configured to perform a cell reduction process comprising reducing the first and second kind of cells in size.

* * * * *